United States Patent [19]

Ditch

[11] Patent Number: 5,340,066
[45] Date of Patent: Aug. 23, 1994

[54] STAND FOR ARTICLE

[75] Inventor: Kevin J. Ditch, Melville, Mo.

[73] Assignee: American Trading and Production Corporation, Baltimore, Md.

[21] Appl. No.: 3,416

[22] Filed: Jan. 12, 1993

[51] Int. Cl.[5] .................................... F16M 11/38
[52] U.S. Cl. ................................ 248/170; 248/525; 248/188.6; 248/188.7
[58] Field of Search ............... 248/163.1, 166, 170, 248/188, 188.6, 188.7, 440, 523, 525, 528

[56] References Cited

U.S. PATENT DOCUMENTS

| D. 326,969 | 6/1992 | Eason et al. | |
|---|---|---|---|
| 730,062 | 6/1903 | Widmer | 248/170 |
| 1,729,129 | 9/1929 | Seelan | 248/525 |
| 1,863,756 | 6/1932 | Lufkin | 248/170 |
| 3,709,454 | 1/1973 | Hyde | 248/440 X |
| 4,010,922 | 3/1977 | Heller et al. | 248/170 X |
| 4,377,269 | 3/1983 | Sellner | 248/188.6 |
| 4,671,479 | 6/1987 | Johnson et al. | |
| 4,774,536 | 5/1988 | Bancalari | 248/166 X |
| 4,905,946 | 3/1990 | Wang | 248/170 |
| 4,923,156 | 5/1990 | Linneuson | 248/170 |
| 5,048,789 | 9/1991 | Eason et al. | |
| 5,082,222 | 1/1992 | Hsu | 248/170 |
| 5,102,079 | 4/1992 | Lee | 248/170 X |

FOREIGN PATENT DOCUMENTS 1228071 11/1966 Fed. Rep. of Germany ...... 248/170
865893 4/1961 United Kingdom ............. 248/188.6

OTHER PUBLICATIONS

Music Industries Corp.; A-300 Microlite Tripod Stand; 1992; Published in U.S.A. (Advertising Brochure).
Atlas/Soundolier; Portable Microphone Floor Stands Model Nos. PSC, PSCE and PS.-3; 1990; Published in U.S.A. (Catalog data).

Primary Examiner—David A. Scherbel
Assistant Examiner—Derek J. Berger
Attorney, Agent, or Firm—Cohn, Powell & Hind

[57] ABSTRACT

This support stand (10) includes an elongate member (12), supporting a microphone (M) at the upper end, a base member (14) receiving the lower end of the elongate member (12) in sliding relation and three legs (20) pivotally connected to the base member (14). Each of the legs (20) includes an inner end engageable with the elongate member (12) to clamp said member in a support position and to clamp said member in a collapsed position. The support stand also includes a tilt assembly (80) providing a sliding member (82) mounted to one of the legs (20a) and having an inner end (90) movable into engagement with the base member (14) to tilt the elongate member (12).

15 Claims, 2 Drawing Sheets

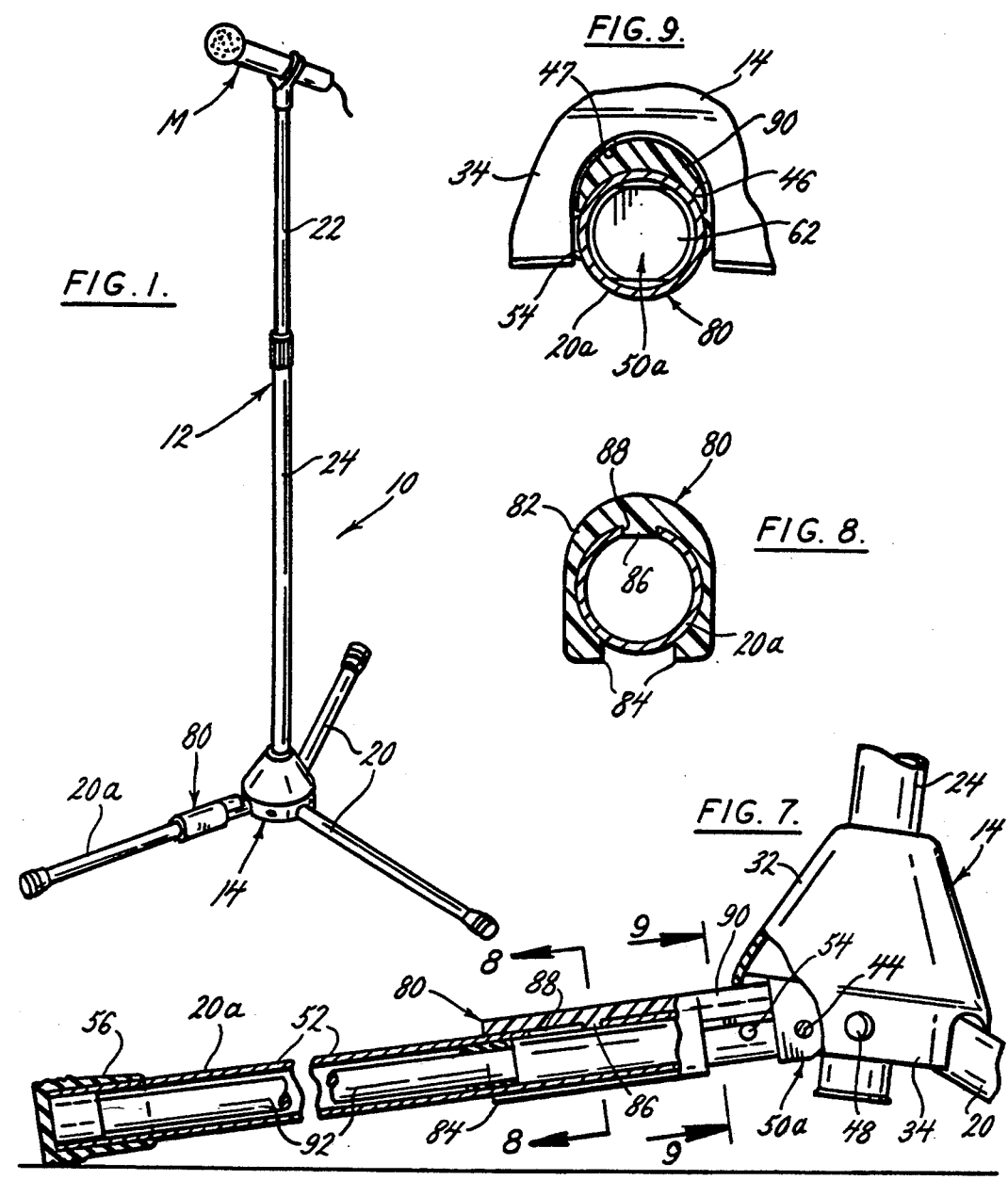

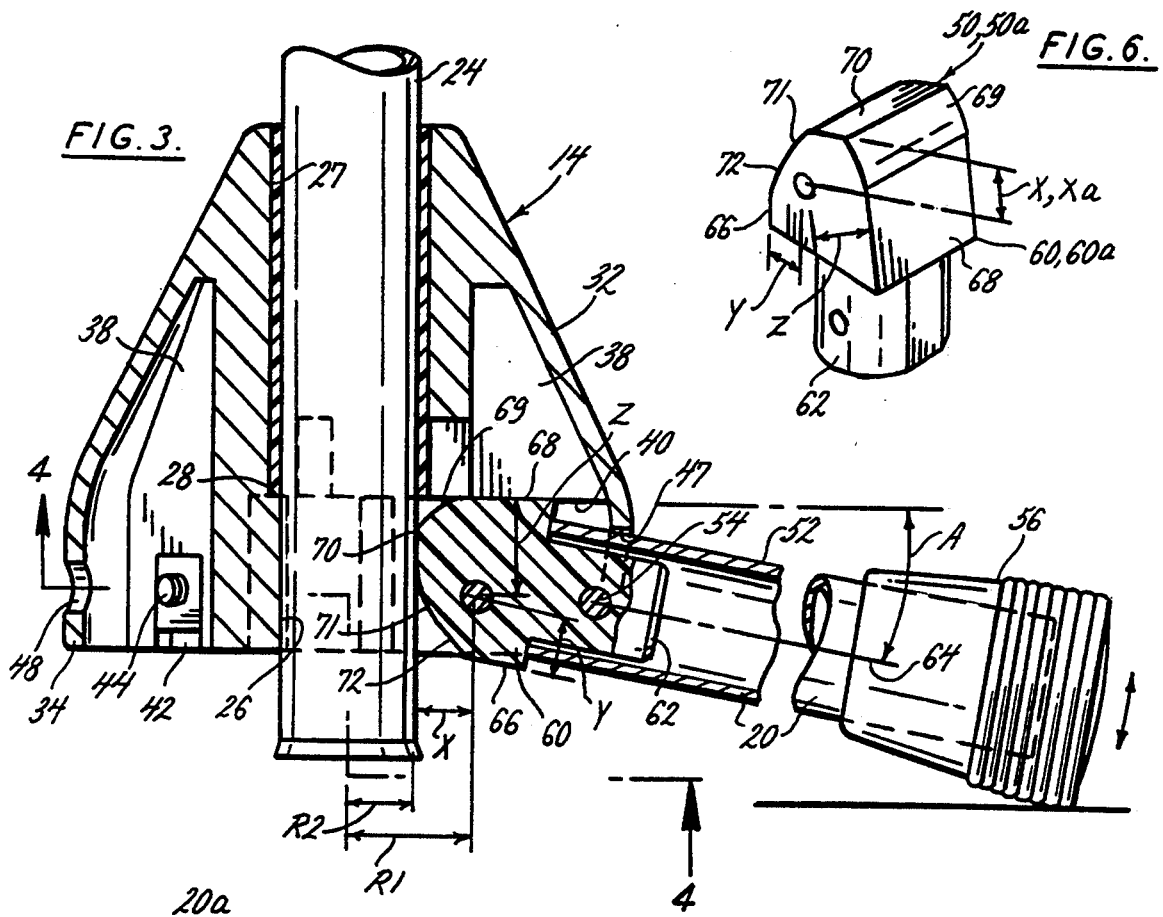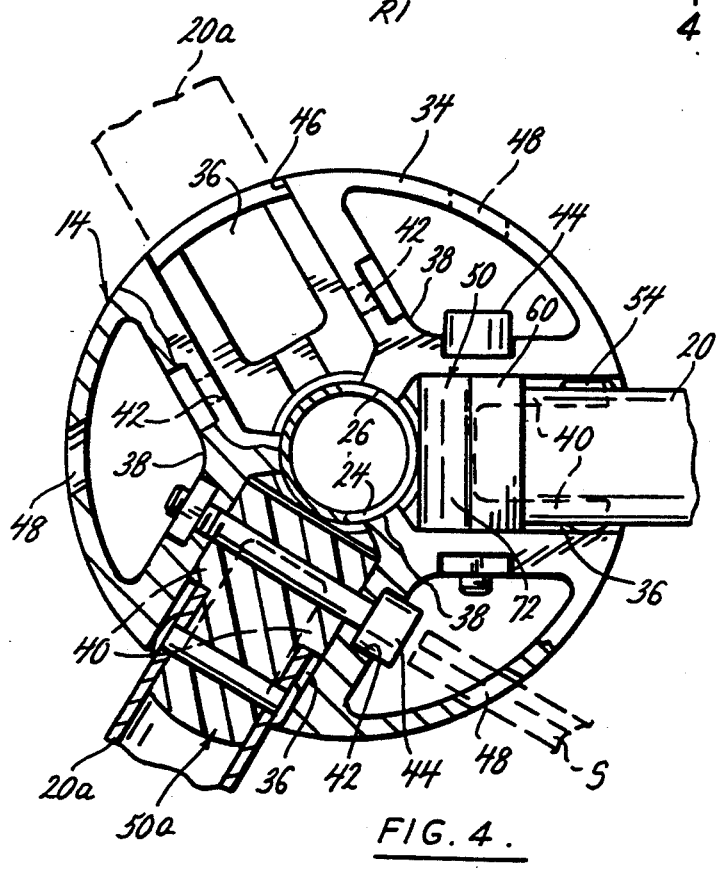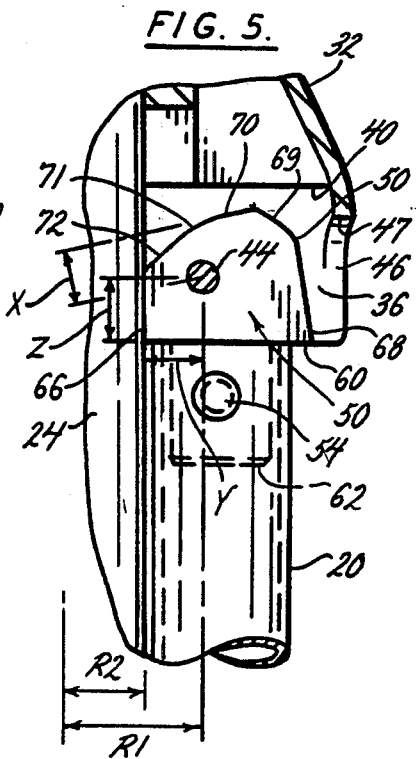

STAND FOR ARTICLE

BACKGROUND OF THE INVENTION

This invention relates generally to stands for articles, and particularly to collapsible stands for supporting microphones and similar articles.

Stands for microphones, and the like, are widely used by stage performers and certain features are particularly desirable. Among these are stability, portability and lightness of weight. Stability can be achieved by providing a heavy circular base member but has the disadvantage of resulting in a stand which is both heavy and bulky. Portability can be achieved by utilizing a telescoping stand with collapsible legs and these features are disclosed in U.S. Pat. No. 4,671,479, which is primarily directed to a quick release telescoping stand but also features upwardly foldable legs. This stand has the disadvantage of having a fixed base member relative to the stem and does not readily lend itself to providing a truly compact unit. Lightness is readily achieved by choosing a lightweight, or thin metal gauge which is, however, not compatible with stability.

The present stand overcomes these and other disadvantages in a manner not revealed by the known prior art.

SUMMARY OF THE INVENTION

This support stand, which is particularly useful for stage performers, provides stability, portability and relative lightness in use.

It is an aspect of this invention to provide a support stand which comprises an elongate member including an article-attachable upper portion and a lower portion, a base member including a portion receiving the lower portion of the elongate member in sliding relation and a plurality of leg-receiving portions, and a plurality of leg members mounted to the base member for movement between a support position and a collapsed position, each leg member including an inner end, received in pivoted relation within an associated leg-receiving portion, and an outer ground-supporting end, each inner end including a first cam face operatively engageable with the elongate member in friction relation in the support position.

It is another aspect of this invention to provide a support stand in which each leg member inner end includes a second cam face operatively engageable with the elongate member in friction relation in the collapsed position.

It is yet another aspect of this invention to provide a support stand which comprises an elongate member including an article-attachable upper portion and a lower portion, a base member including a portion receiving the lower portion of the elongate member and a plurality of leg-receiving portions, and a plurality of leg members mounted to the base member for movement between a support position and a collapsed position, each leg member including an inner end, received in pivoted relation within an associated leg-receiving portion, and an outer ground-supporting end, one of said leg members including a movable member having a front end movable into a position operatively disposed between said leg member and said base member to tilt said stand.

This support stand is relatively inexpensive, simple to manufacture and effective in use.

BRIEF DESCRIPTION OF THE DRAWINGS

FIG. 1 is a perspective view of a microphone stand according to the invention;

FIG. 2 is an elevational view of the base member and leg members;

FIG. 3 is an enlarged fragmentary cross-sectional view through the base member and leg member;

FIG. 4 is a view, partly in cross-section, taken on line 4-4 of the underside of the base member;

FIG. 5 is a fragmentary view showing the stand in the collapsed position;

FIG. 6 is a perspective view of a cam insert;

FIG. 7 is a fragmentary view of the stand showing the tilt assembly;

FIG. 8 is a cross-sectional view taken on line 8—8 of FIG. 7, and

FIG. 9 is a cross-sectional view taken on line 9—9 of FIG. 7.

DESCRIPTION OF THE PREFERRED EMBODIMENT

Referring now by reference numerals to the drawings and first to FIGS. 1-3 it will be understood that the support stand 10 includes an elongate, tubular stem member 12 attached to a base member 14 and having a plurality of pivotally connected leg members. In the embodiment shown, two identical leg members 20 are provided and one leg member 20a which has some differences from leg members 20, as will be described. All three leg members are movable from a support position to a collapsed position shown in phantom outline in FIG. 2.

The elongate member 12 includes an upper portion 22, adapted to carry an article such as a microphone M, and a lower portion 24. The base member 14 includes a central bore 26 having an enlarged upper portion 25 and a partial lower portion 27 defined by an abutment 28 providing a stop for a plastic sleeve 30. The inside of the sleeve 30 and the bore lower portion 27 are of substantially the same diameter, sized to receive the elongate member lower portion 24 in sliding relation which is flared at the lower end to prevent inadvertent removal. The base member 14 also includes a frusto-conical upper wall portion 32 and a generally cylindrical lower wall portion 34 and said base member is divided into three cavities 36 by three Y-shaped web members 38 having arms defining said cavities 36 and recessed to provide abutments 40, the stems of the Y-shaped webs providing the bore lower portion 27. The web arms include apertures 42 adapted to receive first pins 44. The base cylindrical lower wall portion 34 includes arcuate openings 46 providing entry to cavities 36 and sized to received legs 20 and 20a, and openings 48 providing access to pins 44 by screwdriver S as shown in phantom outline in FIG. 4.

The leg members 20 and 20a each includes a cam insert member 50 and 50a, respectively, at the inner end, an intermediate tubular member 52 to which each insert is attached, as by rivet 54, and a ground-engaging tip 56 of rubber, or the like, at the outer end. As best shown in FIG. 6, the two insert members 50 are substantially identical in configuration. Insert member 50a, on the other hand, is slightly dimensionally different, as will be discussed below.

Each of the inserts 50 and 50a includes an enlarged cam head portion 60 and 60a, respectively, and a shaft portion 62 adapted to interfit the tubular member 52.

The cam head portion 60 of legs 20 includes a flat 66 parallel with the longitudinal axis 64 of the leg 20, a flat 68 inclined at a small angle A, ten degrees in the embodiment shown, to said longitudinal axis, and a flat 70 perpendicular to said flat 68 and a flat 72 inclined at an angle of about fifty degrees to said longitudinal axis. An arcuate surface 69 is provided between said flats 68 and 70 tangential to flat 68 and intersecting flat 70 and an arcuate surface 71 is provided between and tangential to said flats 70 and 72. The perpendicular distance between the pivot center defined by pivot pin 44 and the line of tangency of flat 70 is indicated by X. The perpendicular distance between the pivot center and the line of tangency of flat 66 is indicated by Y. The perpendicular distance between the pivot center and the line of tangency of flat 68 is indicated by Z.

The flat 70 engages the tubular member 24 in the support position and constitutes a first cam face and the flat 68 engages the abutment 40 in the support position and constitutes a bearing face. The flat 68 engages the abutment 40 in collapsed position and constitutes a second cam face.

The cam head portion 60a of leg 20a is similar to cam head portion 60 except that the perpendicular distance between the pivot center defined by pivot pin 44 and the line of tangency of flat 70a, indicated by Xa is slightly greater than X. However, the perpendicular distance between the pivot center and the line of tangency of the flat 66a is identical to that indicated by X, and the line of tangency of flat 68 is identical to that indicated by Z.

In the support position shown in FIG. 3, the abutment 40 is engaged by the cam insert flat 68, which prevents rotation of the leg member in a counterclockwise direction, such rotation also being resisted by engagement between the leg tubular member 52 and the upper portion 47 of the arcuate opening 46 if desired. In the support position, the insert flat 70 of each leg member 20 engages the tubular member 24. Also in the support position, the flat 70a engages the tubular member 24, and because of the differences in the dimension X and Xa the pressure point of the cam inserts 50 and 50a results in a clamping/locking action between the cam inserts and the tubular member 24 preventing relative sliding movement of said tubular member 24. The differences in dimensions X and Xa provides that the clamping action is determined primarily by insert 50a.

In the support position, as shown in FIG. 3, the extent of the clamping action by the inserts 50 and 50a is determined by the difference between the pivot radius R1 and the elongate tubular member radius R2, as compared with the distance X or Xa. In the embodiment shown, having a nominal ⅞″ diameter tubular member 24, R2=0.429″, and pivot radius R1=0.840″, it has been found advantageous to choose X=0.411″ and Xa=0.437″. This results in R1−R2=0.411″ with a theoretical deformation of 0.437″−0.411″=0.026″ at insert 50a and a theoretical deformation of 0.00″ at insert X. Accordingly, in the support position, the primary deformation is provided by leg 20a.

In the collapsed position shown in FIG. 5, the flat 66 engages the tubular member 24 in a selected position in which said member is substantially retracted relative to the base member 14 and the insert flat 66 of each leg member 20 engages the tubular member 24. Also in the collapsed position, the flat 66a engages the tubular member 24. The dimension Y is the same for each leg so that the clamping action between the leg member and the tubular member 24 is the same.

In the collapsed position, as shown in FIG. 5, the extent of the clamping action by the inserts 50 and 50a is determined by the difference between the pivot radius R1 and the elongate tubular member radius R2 as compared with the distance Y. In the embodiment shown, for a nominal ⅞″ diameter tubular member 24 having R2=0.429″ and pivot radius R1=0.840″ it has been found advantageous to choose Y=0.416″. This results in R1-R2=0.411″ with an equal theoretical deformation of 0.416″−0.411″=0.005″ at inserts 50 and inserts 50a, which is suitable for clamping the base member 14 to the tubular member 24 at a selected point along the length of the tubular member 24 to optimize compactness of the stand 10 for carrying and storing purposes with the projection of the member 24 and the legs being about equal.

It will be understood that the radii of the arcuate surfaces 69 and 71 are chosen to facilitate movement of the legs 20 and 20a between the support and collapsed positions in clearance or near clearance relation to permit sliding of the elongate member 24 relative to the base member 14 in between the clamping positions.

As shown in FIGS. 1, 2 and 7–9 the support stand 10 includes a tilt assembly indicated by 80 and provided on leg 20a in the preferred embodiment. The tilt assembly 80 includes a generally U-shaped partial sleeve member 82 which overfits leg member 20a in sliding relation and includes arcuately formed retaining lips 84. The bight portion of the sleeve 82 includes a circular lug 86 which is received in a slot 88 formed in the wall of leg member 20a and determines the travel of the sleeve member 82. At its forward end the sleeve member 82 includes an arcuate fill portion 90, which is substantially the same internal and external diameter as the leg member 20a external diameter and is therefore sized to interfit the base member arcuate opening 46. Because of this arrangement, the fill member 90 engages the opening rim at 47 which would otherwise be engaged by the leg member 20a with the result that the stand 10 is tilted from the vertical an amount determined by the thickness of the fill portion 90. In the embodiment shown, the leg member 20a includes an elongate tubular weight 92, which provides additional stability to said leg member.

In the embodiment shown, the inserts 50 and 50a and the tilt assembly parts 82 and 90 are injection molded resin such as Delrin or Celcon. The base member 14 is a zinc die cast and the tubular member 24 and leg members 20 are steel tubing.

In view of the above it will be understood that various aspects and features of the invention are achieved and other advantageous results are attained. While a preferred embodiment of the support stand has been shown and described, it will be clear to those skilled in the art that various modifications may be made without departure from the invention in its broader aspects. For example, although the preferred embodiment is shown with three legs, four or more legs could also be provided if desired. Further, although in the embodiment described insert dimension Xa for leg 20a in the support position is greater than insert dimension X for legs 20, the same dimension X can be used for all legs provided that it is selected to ensure that a clamping force is provided to hold the member 24 firmly in position during use.

I claim as my invention:

1. A support stand for holding an article in an elevated position, the stand comprising:
   (a) an elongate member including an article-attachable upper portion and a lower portion,
   (b) a single base member including a portion receiving the lower portion of the elongate member in sliding relation and a plurality of leg-receiving portions, and
   (c) a plurality of leg members mounted to the base member for movement between a support position and a collapsed position, each leg member including an inner end, received in pivoted relation within an associated leg-receiving portion, and an outer ground-supporting end,
   (d) each inner end including a first cam face directly engageable with the elongate member in friction relation in the support position.

2. A stand as defined in claim 1, in which:
   (e) the base member includes a plurality of abutments, and
   (f) each leg member inner end includes a bearing face engageable with an associated abutment in the support position.

3. A stand as defined in claim 1, in which:
   (e) three leg members are provided including two having substantially identical inner ends and one having a different inner end.

4. A stand as defined in claim 3, in which:
   (f) the first cam face of one of said inner ends is disposed from its pivot center a distance different from the first cam face than that of the other two inner ends from their pivot centers.

5. A stand as defined in claim 3, in which:
   (f) the first cam face of one of said inner ends is disposed from its pivot center a distance greater from the first cam face than that of the other two inner ends from their pivot centers.

6. A stand as defined in claim 1, in which:
   (e) the base member includes a plurality of abutments,
   (f) each leg member inner end includes a bearing face engageable with an associated abutment in the support position, and
   (g) said first cam face and said bearing face are separated from each other by an arcuate face to facilitate movement from the support position to the collapsed position.

7. A support stand for holding an article in an elevated position, the stand comprising:
   (a) an elongate member including an article-attachable upper portion and a lower portion,
   (b) a base member including a portion receiving the lower portion of the elongate member in sliding relation and a plurality of leg-receiving portions, and
   (c) a plurality of leg members mounted to the base member for movement between a support position and a collapsed position, each leg member including an inner end, received in pivoted relation within an associated leg-receiving portion, and an outer ground-supporting end,
   (d) each inner end including a first cam face operatively engageable with the elongate member in friction relation in the support position,
   (e) each leg member inner end including a second cam face operatively engageable with the elongate member in friction relation in the collapsed position.

8. A stand as defined in claim 7, in which:
   (f) the second cam face of each of said inner ends is disposed from its pivot center a substantially equal distance.

9. A support stand for holding an article in an elevated position, the stand comprising:
   (a) an elongate member including an article-attachable upper portion and a lower portion,
   (b) a base member including a portion receiving the lower portion of the elongate member in sliding relation and a plurality of leg-receiving portions, and
   (c) a plurality of leg members mounted to the base member for movement between a support position and a collapsed position, each leg member including an inner end, received in pivoted relation within an associated leg-receiving portion, and an outer ground-supporting end,
   (d) each inner end including a first cam face operatively engageable with the elongate member in friction relation in the support position,
   (e) each leg member inner end including a second cam face operatively engageable with the elongate member in friction relation in the collapsed position, and
   (f) said first and second cam faces being separated from each other by an arcuate face to facilitate movement from the support position to the collapsed position.

10. A support stand for holding an article in an elevated position, the stand comprising:
    (a) an elongate member including an article-attachable upper portion and a lower portion,
    (b) a base member including a portion receiving the lower portion of the elongate member in sliding relation and a plurality of leg-receiving portions, and
    (c) a plurality of leg members mounted to the base member for movement between a support position and a collapsed position, each leg member including an inner end, received in pivoted relation within an associated leg-receiving portion, and an outer ground-supporting end,
    (d) each inner end including a first cam face operatively engageable with the elongate member in friction relation in the support position,
    (e) one of said legs including a movable member including a front end movable into a position operatively disposed between said leg and said base to alter the angle between said one leg and said base to tilt said stand.

11. A stand as defined in claim 10, in which:
    (f) one of said leg member and said movable member includes a slot and the other of said members includes a limit member received by said slot to determine movement of said member relative to said slot.

12. A stand as defined in claim 11, in which:
    (g) said movable member is a partial sleeve member having an arcuate wall greater than one hundred and eighty degrees to retain said sleeve member on said leg member.

13. A stand as defined in claim 10, in which:
    (f) said one leg member is tubular and includes a weight received therewithin.

14. A support stand for holding an article in an elevated position, the stand comprising:
    (a) an elongate member including an article-attachable upper portion and a lower portion, (b) a base member including a portion receiving the lower portion of the elongate member and a plurality of leg-receiving portions, and (c) a plurality of leg members mounted to the base member for movement between a support position and a collapsed position, each leg member including an inner end, received in pivoted relation within an associated leg-receiving portion, and an outer ground-supporting end, (d) one of said leg members including a movable member having a front end movable into a position operatively disposed between said leg member and said base member to tilt said stand.

15. A support stand for holding an article in an elevated position, the stand comprising:

(a) an elongate member including an article-attachable upper portion and a lower portion, (b) a base member including a portion receiving the lower portion of the elongate member in sliding relation and a plurality of leg-receiving portions, and (c) a plurality of leg members mounted to the base member for movement between a support position and a collapsed position, each leg member including an inner end, received in pivoted relation within an associated leg- receiving portion, and an outer ground-supporting end, (d) each inner end including a locking means operatively engageable with the elongate member in locking relation in the support position and in the collapsed position.

* * * * *